United States Patent [19]

Macrum

[11] 4,378,062

[45] Mar. 29, 1983

[54] TILTING CARRIER SYSTEM

[75] Inventor: Samuel H. Macrum, Frederick, Md.

[73] Assignee: Acco Industries Inc., Bridgeport, Conn.

[21] Appl. No.: 955,935

[22] Filed: Oct. 30, 1978

[51] Int. Cl.³ ............................................. B65G 47/46
[52] U.S. Cl. ..................................... 198/365; 198/802
[58] Field of Search .......... 198/365, 802, 796, 483482, 198/437, 836, 706

[56] References Cited

U.S. PATENT DOCUMENTS

| | | | |
|---|---|---|---|
| 3,093,245 | 6/1963 | Worcester | 198/437 |
| 3,517,708 | 6/1970 | Eisenberg | 198/706 |
| 3,589,501 | 6/1971 | Harrison | 198/365 |
| 3,669,245 | 1/1970 | Wooten et al. | 198/365 |
| 3,800,938 | 4/1974 | Stone | 198/836 |

Primary Examiner—Joseph E. Valenza
Assistant Examiner—Brian Bond
Attorney, Agent, or Firm—Barnes, Kisselle, Raisch, Choate, Whittemore & Hulbert

[57] ABSTRACT

A tilting carrier conveyor system comprising a track, a plurality of carriers movable along the track, and means for moving the carriers along the track. Each carrier has a load carrying member supported on the carrier for tilting movement in a plane transverse to the direction of movement of the carrier. Tilt control means comprise a guide track member in the form of a single vertical wall extending along the path of the carriers, a guide follower on each load carrying member comprising a bifurcated member defining a downwardly open-ended slot into which the vertical wall comprising the guide track member extends such that as the carrier is moved along the track, the load carrying member thereon is guided in its tilting movement by the vertical wall.

1 Claim, 6 Drawing Figures

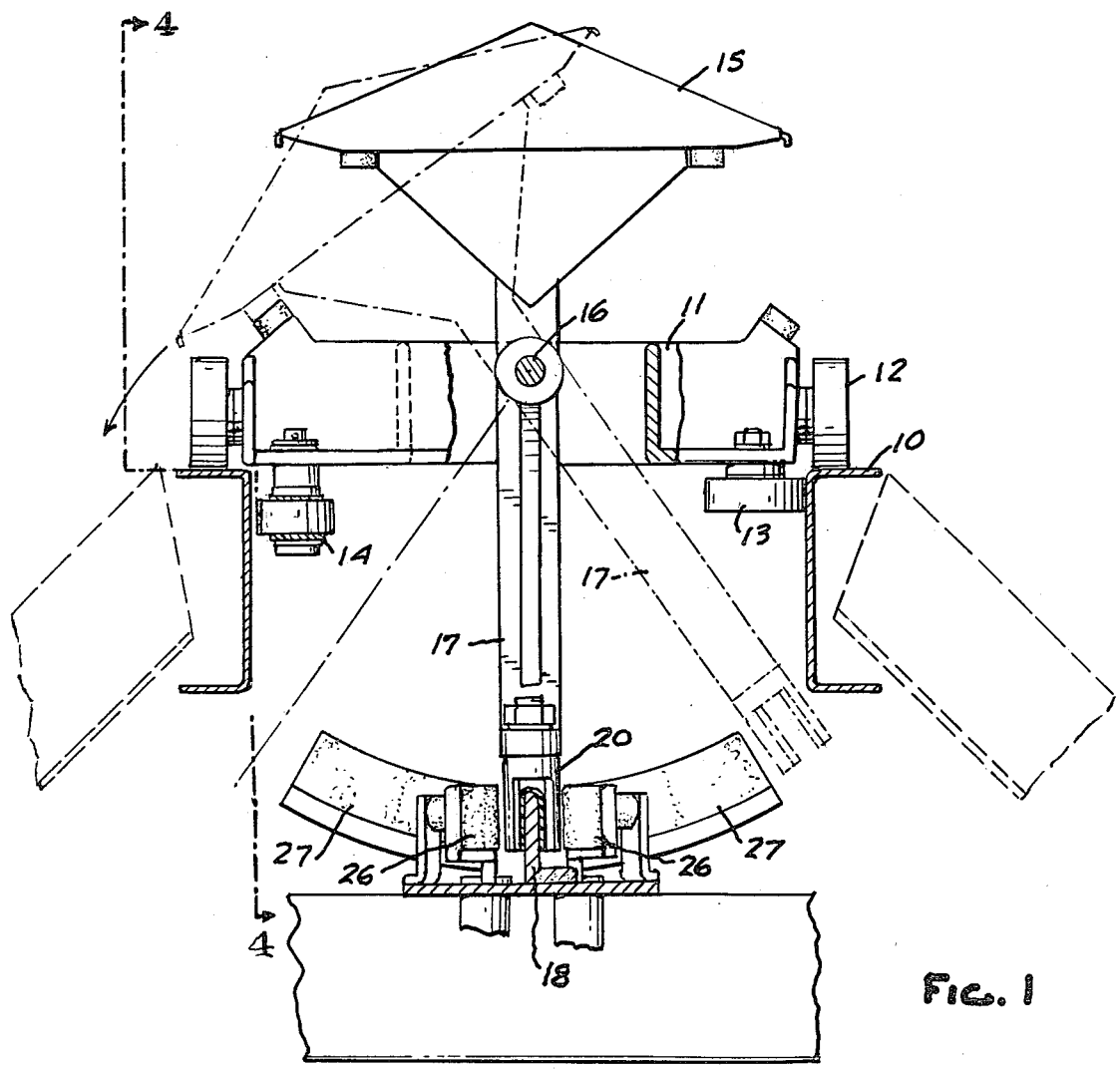
Fig. 1
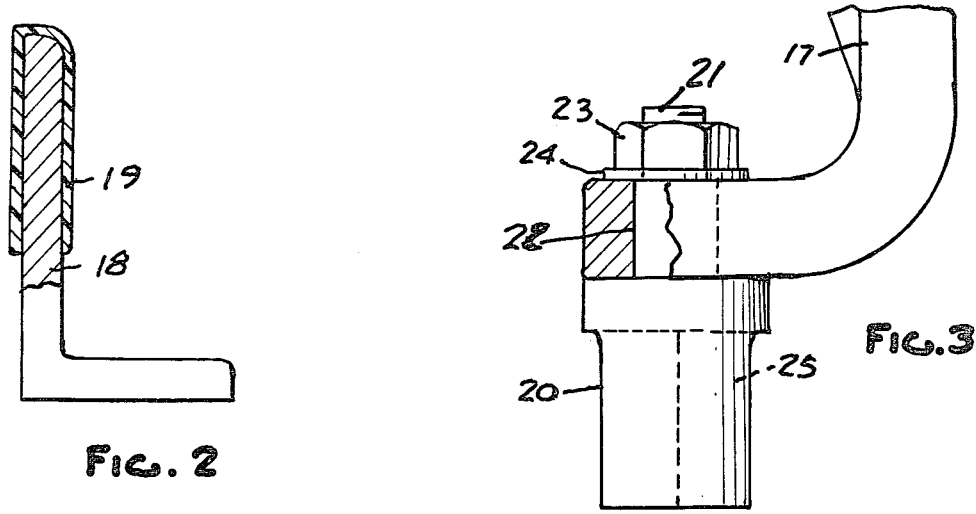
Fig. 2
Fig. 3

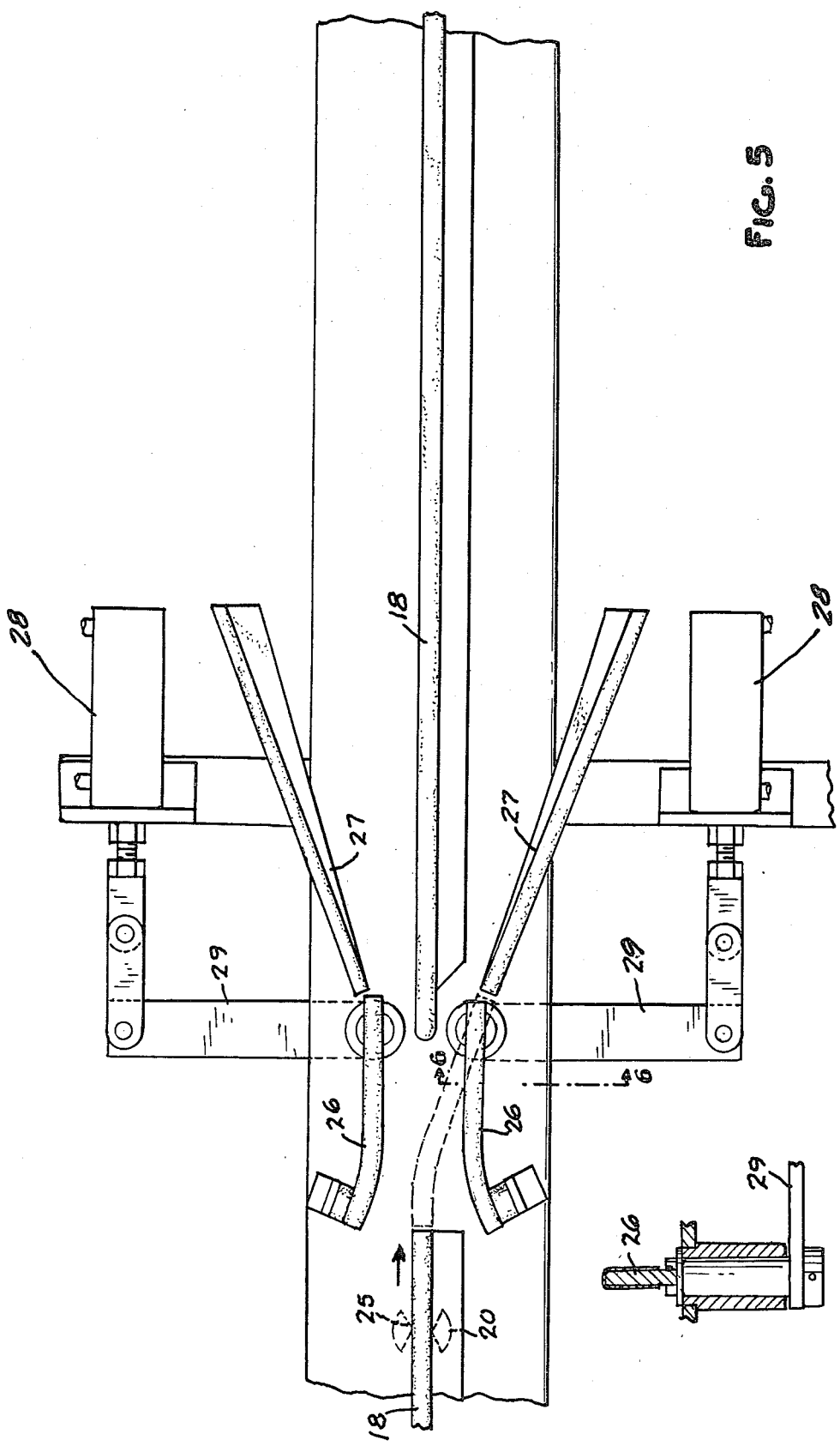

TILTING CARRIER SYSTEM

This invention relates to tilting carrier systems such as tilting tray or tilting slat systems.

BACKGROUND AND SUMMARY OF THE INVENTION

One type of conveyor system for moving articles from one place to another is commonly known as a tilting tray or slat system wherein a plurality of carriers is movable along a track and each has a tray or slat supporting a load which is tiltable at selected positions along the path of the carriers to discharge an article therefrom. Such a system is shown in U.S. Pat. No. 3,669,245.

Among the objects of the present invention are to provide a tilting carrier system which is simpler, utilizes fewer parts, is easier to fabricate, is easier to install, requires less maintenance, is more quiet in operation, and is substantially less expensive.

DESCRIPTION OF THE DRAWINGS

FIG. 1 is a part sectional transverse elevational view of a system embodying the invention.

FIG. 2 is a fragmentary sectional view of a portion of the system shown in FIG. 1.

FIG. 3 is a fragmentary part sectional view of a portion of the system.

FIG. 5 is a fragmentary plan view of a portion of the system.

FIG. 6 is a fragmentary sectional view taken along the line 6—6 in FIG. 5.

DESCRIPTION

Figure 4:
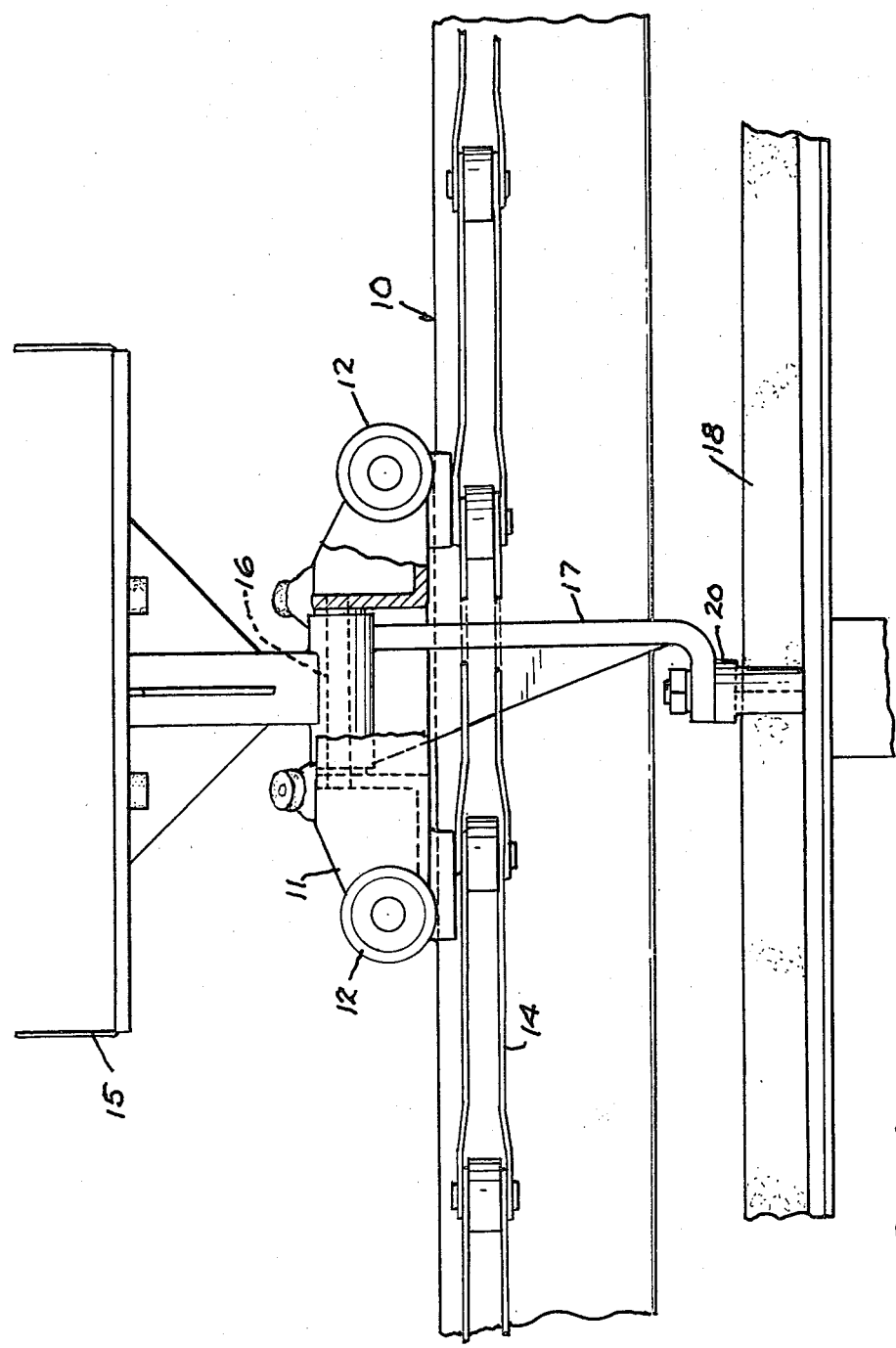
FIG. 4 is a fragmentary side elevational view of the system.

Referring to FIGS. 1 and 4, the tilting carrier system embodying the invention comprises a track 10 made of spaced channels supporting a plurality of carriers 11, each of which has wheels 12, 13 engaging the channels of the track 10. The carriers are interconnected by a chain 14 and each carrier has a load carrying member 15 in the form of a tray or slat that is pivoted about a longitudinal shaft 16 by means of an arm 17.

The control of the tilting of the carrier is achieved by a guide track 18 in the form of a single vertical wall, preferably having a layer 19 of low friction plastic material thereon. A follower member 20 is fixed to the lower end of the arm 17, which arm pivots about an axis passing through the axis of shaft 16. As shown in FIG. 3, this is achieved by a bolt 21 extending through an opening 22 with a light press fit and locked in position by a nut 23 and washer 24. The guide follower member 20 is bifurcated to form a downwardly open slot 25 into which the guide track 18 extends. The surfaces of the slot 25 diverge outwardly in a forward and rearward direction so that they are at an angle to the axis of movement thereby permitting freedom for the swing out and tilt action.

In this fashion, as the carriers 11 are moved along the track 10, the load carrying member 15 thereon is tilted depending upon the position of the guide track 18.

If it is desired to have selective control of the tilting, an arrangement such as shown in FIG. 5 may be used wherein the guide track 18 is interrupted and transfer portions 26 can be selectively moved into alignment with the end of the track 18 at the space in order to guide the follower laterally to guide track members 27, which are also of a single wall construction, but are inclined as desired to tilt the tray. Control of the transfer portions 26 is achieved by a power cylinder 28 connected by linkage 29 to the portions 26. The forward ends of the track members 27 are positioned such that they will not interfere with the passage of a previously tilted carrier. In order to return the carrier to its upright position, movable transfer portions can be provided downstream, each of which is of a single wall construction, in order to guide the tilted carrier back to its upright position so that the follower member 20 thereon is in alignment with the guide track 18.

It can thus be seen that there has been provided a tilting carrier system which utilizes fewer parts, is easier to fabricate, is easier to install, requires less maintenance, is more quiet in operation, and is substantially less expensive.

I claim:

1. A tilting carrier conveyor system comprising
a track,
a plurality of carriers movable along said track,
means for moving the carriers along the track,
each said carrier having a load carrying member,
means for supporting said load carrying member on said carrier for tilting movement in a plane transverse to the direction of movement of the carrier,
and tilt control means comprising a guide track member extending along the path of the carriers,
said guide track member comprising a single generally upwardly extending vertical wall,
a guide follower on each said load carrying member comprising a bifurcated member defining a downwardly open-ended slot having opposed contacting surfaces into which the vertical wall comprising the guide track member extends such that as the carrier is moved along the track, said contacting surfaces engage said vertical wall to guide the load carrying member in its tilting movement, said slot having forwardly and rearwardly diverging surfaces.

* * * * *